(12) United States Patent
Basapur et al.

(10) Patent No.: US 10,585,546 B2
(45) Date of Patent: Mar. 10, 2020

(54) INTERACTIVE METHOD AND APPARATUS FOR MIXED MEDIA NARRATIVE PRESENTATION

(71) Applicant: General Instrument Corporation, Horsham, PA (US)

(72) Inventors: Santosh S. Basapur, Hanover Park, IL (US); Shirley A. Chaysinh, Grayslake, IL (US); Hiren M. Mandalia, Elk Grove Village, IL (US); Narayanan Venkitaraman, Palatine, IL (US)

(73) Assignee: ARRIS Enterprises LLC, Suwanee, GA (US)

( * ) Notice: Subject to any disclaimer, the term of this patent is extended or adjusted under 35 U.S.C. 154(b) by 414 days.

(21) Appl. No.: 13/857,550

(22) Filed: Apr. 5, 2013

(65) Prior Publication Data

US 2014/0289654 A1   Sep. 25, 2014

Related U.S. Application Data

(60) Provisional application No. 61/803,309, filed on Mar. 19, 2013.

(51) Int. Cl.
*G06F 3/0481* (2013.01)
*G11B 27/10* (2006.01)
(Continued)

(52) U.S. Cl.
CPC .......... *G06F 3/0481* (2013.01); *G06F 16/447* (2019.01); *G11B 27/105* (2013.01); *G11B 27/34* (2013.01)

(58) Field of Classification Search
CPC .......... G06F 3/00; G06F 3/048; G06F 3/0481; G06F 3/0482; G06F 3/0484; G11B 27/34;
(Continued)

(56) References Cited

U.S. PATENT DOCUMENTS

| | | |
|---|---|---|
| 7,512,886 B1 | 3/2009 | Herberger et al. |
| 7,716,572 B2 | 5/2010 | Beauregard et al. |

(Continued)

FOREIGN PATENT DOCUMENTS

| | | | | |
|---|---|---|---|---|
| EP | 2209311 A1 | 7/2010 | | |
| KR | 10-2012-0123112 | * 11/2012 | .......... | H04N 21/472 |
| WO | 2008/117926 A1 | 10/2008 | | |

OTHER PUBLICATIONS

PCT Search Report, Re: Application #PCT/US2014/031182; dated Aug. 8, 2014.

(Continued)

*Primary Examiner* — Xiomara L Bautista
(74) *Attorney, Agent, or Firm* — Stewart M. Wiener

(57) ABSTRACT

An interactive interface for a computing device enables a user to select the medium of expression in which a segment of a narrative will be presented. The narrative has a plurality of presentable narrative segments, at least one of which is presentable in multiple mutually substitutable mediums of expression. The interface includes a control enabling a user to select a narrative segment class containing segments of a first medium expression. The selected segments are presented in substitution for respective segments of another narrative segment class of a second medium expression.

15 Claims, 13 Drawing Sheets

(51) Int. Cl.
*G11B 27/34* (2006.01)
*G06F 16/44* (2019.01)

(58) Field of Classification Search
CPC ... H04N 21/4622; H04N 5/44543; H04N 5/50
See application file for complete search history.

(56) References Cited

U.S. PATENT DOCUMENTS

| | | | |
|---|---|---|---|
| 8,009,966 B2 | 8/2011 | Bloom et al. | |
| 8,600,211 B2* | 12/2013 | Nagano | H04N 9/8227 386/223 |
| 8,972,265 B1* | 3/2015 | Lester | G10L 13/00 704/246 |
| 9,213,705 B1* | 12/2015 | Story, Jr. | G06F 17/30056 |
| 2003/0192049 A1* | 10/2003 | Schneider | H04N 7/165 725/51 |
| 2008/0240676 A1* | 10/2008 | Kim | G06F 17/30056 386/326 |
| 2009/0307721 A1* | 12/2009 | Afram | H04N 5/44543 725/34 |
| 2010/0209003 A1 | 8/2010 | Toebes et al. | |
| 2011/0106970 A1 | 5/2011 | Song et al. | |
| 2012/0066592 A1* | 3/2012 | Issa | G06F 3/0485 715/716 |
| 2012/0185905 A1* | 7/2012 | Kelley | H04N 9/75 725/109 |
| 2012/0246343 A1* | 9/2012 | Story, Jr. | H04L 67/1095 709/248 |
| 2012/0324324 A1* | 12/2012 | Hwang | G09B 5/06 715/203 |
| 2013/0041747 A1* | 2/2013 | Anderson | G06Q 10/10 705/14.39 |
| 2013/0071090 A1* | 3/2013 | Berkowitz | H04N 21/6547 386/248 |
| 2013/0074133 A1* | 3/2013 | Hwang | G06F 17/30038 725/93 |
| 2013/0124664 A1 | 5/2013 | Fonseca, Jr. et al. | |
| 2013/0125188 A1 | 5/2013 | Mandalia et al. | |
| 2013/0132521 A1 | 5/2013 | Fonseca, Jr. et al. | |
| 2013/0144725 A1 | 6/2013 | Li et al. | |
| 2013/0287365 A1 | 10/2013 | Basapur et al. | |
| 2013/0290488 A1 | 10/2013 | Mandalia et al. | |
| 2013/0290859 A1 | 10/2013 | Venkitaraman et al. | |
| 2013/0290892 A1 | 10/2013 | Basapur et al. | |
| 2013/0298179 A1 | 11/2013 | Baum et al. | |
| 2013/0346414 A1 | 12/2013 | Smith et al. | |
| 2013/0346631 A1 | 12/2013 | Gandhi et al. | |
| 2013/0347017 A1 | 12/2013 | Li et al. | |
| 2013/0347057 A1 | 12/2013 | Hurwitz et al. | |
| 2014/0009476 A1 | 1/2014 | Venkitaraman et al. | |
| 2014/0028917 A1 | 1/2014 | Smith et al. | |
| 2014/0053223 A1* | 2/2014 | Vorobyov | G10L 13/00 725/110 |
| 2014/0089967 A1 | 3/2014 | Mandalia et al. | |
| 2014/0095608 A1 | 4/2014 | Mandalia et al. | |
| 2014/0098293 A1 | 4/2014 | Ishtiaq et al. | |
| 2014/0123182 A1* | 5/2014 | Lee | H04N 21/47217 725/37 |
| 2014/0136186 A1* | 5/2014 | Adami | G06F 17/2264 704/9 |
| 2014/0176604 A1 | 6/2014 | Venkitaraman et al. | |
| 2014/0181160 A1 | 6/2014 | Novak et al. | |
| 2015/0026176 A1* | 1/2015 | Bullock | G06F 17/3064 707/736 |

OTHER PUBLICATIONS

PCT Search Report, RE: Application #PCT/US2014/031177; dated Aug. 14, 2014.
A. Ghandar, et al,, "Pattern Puzzle: A Metaphor for Visualizing Software Complexity Measures", APVis '06 Proceedings of the Asia-Pacific Symposium on Information Visualization, vol. 60, Feb. 1-3, 2006, pp. 221-224.
F. Ritter, et al., "Using a 3D Puzzle as a Metaphor for Learning Spatial Relations", In Proceedings of Graphics Interface, 2000 pp. 171-178.
Amazon Whispersync UI, retrived from URL <http://www.amazon.com/gp/help/customer/display.html/ref=sr_1_1_acs_h_1?ie=UTF8&nodeId=200911660&qid=1405085994&sr=8-1-acs> on Jul. 11, 2014.
"Automatic Mashup Generation of Multiple-camera Videos", Philips Electronics N.V. 2009, 165 pgs.
Official Action, Re: Korean Application No. 10-2015-7028739, dated Jan. 29, 2017.
Official Action, Re: Canadian Application No. 2,912,320, dated Jul. 8, 2016.
Official Action, Re: Korean Application No. 10-2015-7028739, dated Jul. 13, 2016.
Official Action, Re: Canadian Application No. 2,912,320, dated May 16, 2017.
European Examination Report, RE: Application No. 14727987.1, dated Nov. 27, 2017.
Official Action, RE: Mexican Application No. MX/a/2015/012407, dated Nov. 29, 2017.
Official Action, Re: Chinese Application No. 201480016774.1, dated Mar. 12, 2018.
Official Action, RE: Mexican Application No. MX/a/2015/012407, dated Mar. 14, 2018.
Official Action, RE: Canadian Application No. 2,912,320, dated Apr. 4, 2018.
Official Action, RE: Mexican Application No. MX/a/2015/012407, dated Oct. 16, 2018.
Decision of Rejection, Re: Chinese Application No. 201480016774, dated May 22, 2019.
Official Action, RE: Chinese Application No. 201480016774.1, dated Oct. 31, 2018.
Official Action, Re: Canadian Application No. 2,912,320, dated Dec. 3, 2018.
Official Action, RE: Mexican Application No. MX/a/2015/012407, dated Feb. 13, 2019.
Summons to Attend Oral Proceedings, Re: European Application No. 14727987.1, dated Jul. 15, 2019.
Result of Consultation, Re: European Application No. 14727987.1, dated Dec. 5, 2019.
Office Action, Re: Canadian Application No. 2912320, dated Dec. 16, 2019.

* cited by examiner

```xml
<xml>
    <story_id> 93 </story_id>
    <story_title> "Romeo and Juliet" </story_title>
        •
        •
        •
    <map_items>
        <item>
            <segment>
                <media_type>audio</media_type>
                <start> 5:10 </start>
                <end>  7:32 </end>
                <version_id>32</version_id>
            </segment>
            <segment>
                <media_type>video</media_type>
                <start> 3:32 </start>
                <end>  10:02 </end>
                <version_id>72</version_id>
            </segment>
        </item>
    </map_items>
</xml>
```

```xml
<xml>
    <story_id> 93 </story_id>
    <story_title> "Romeo and Juliet" </story_title>
    <segment>
        <media_type>audio</media_type>
        <order> 1 </order>
        <start> ... </start>
        <end> ... </end>
    </segment>
    <segment>
        <media_type>video</media_type>
        <order> 2 </order>
        <start> ... </start>
        <end> ... </end>
    </segment>
    •
    •
    •
</xml>
```
⟵ 342

*FIG. 10*

INTERACTIVE METHOD AND APPARATUS FOR MIXED MEDIA NARRATIVE PRESENTATION

CROSS-REFERENCE TO RELATED APPLICATION

This application claims the benefit of U.S. Provisional Application Ser. No. 61/803,312, filed Mar. 19, 2013. Related subject matter is disclosed in the following patent application, which is commonly owned and co-pending with the present application, and the entire contents of which are hereby incorporated by reference: U.S. patent application Ser. No. 13/857,550, filed herewith, titled "SYSTEM TO GENERATE A MIXED MEDIA EXPERIENCE".

BACKGROUND

The present invention relates to an interactive method and apparatus for presenting portions of a narrative which are expressible in more than one medium.

Narratives or stories are commonly available for electronic presentation on a computing device, such as a laptop or tablet computer or a cellular phone, and are increasingly available in more than one medium of expression. For example, a narrative may be available as an electronic book (e-book), an audio book, a video, a television program and/or a comic strip/book, a group of cartoons arranged in a narrative sequence. Typically, an entire narrative will be presented in a single, consumer selected medium, for example, an audio book. However, with increased availability of narratives in differing mediums of expression, interest in comparing a narrative or a portion of a narrative when presented in different media or in experiencing a multimedia presentation of a narrative has increased.

BRIEF DESCRIPTION OF THE DRAWINGS

FIG. 9 is exemplary program data enabling a user interface for a mixed media narrative presentation, in accordance with an embodiment.

FIG. 10 is exemplary program data enabling presentation of segments of a mixed media narrative in an order and version selected by the user, in accordance with an embodiment.

DETAILED DESCRIPTION

A narrative or story may be expressed in one or more media. For examples, narratives are commonly expressed as a video, an electronic book (e-book), an audio book, a television program and/or comic book/strip, a group of cartoons arranged in a narrative sequence. In embodiments, a method and apparatus are provided for presenting a narrative comprising portions presented in respective user selectable medium(s) of expression.

An embodiment provides a method of presenting a narrative comprising a plurality of successively presentable narrative segments, at least one segment presentable in plural mediums of expression comprises presenting a user interface for a computing device, the user interface comprising a media availability indicator indicating availability of mediums of expressions for presenting a segment of said narrative; and a medium selector operable by the user of the computing device to select one of the plural mediums of expression for presenting the segment of the narrative; and presenting the segment of the narrative in the user selected medium of expression.

A further embodiment provides an apparatus for presenting a narrative comprising a plurality of successively presentable narrative segments, at least one segment presentable in plural mediums of expression comprises a computer accessible memory for storing a program instruction and data; a data processing unit operable according to a program instruction stored in the memory to present a user interface enabling the user to construct the narrative by selecting ones of the narrative segments, each expressible in a selected medium of expression; and an output device communicatively connected to the data processing unit to present the selected segments of the narrative to the user, each segment presented in a respective user selected medium of expression.

Figure 1:
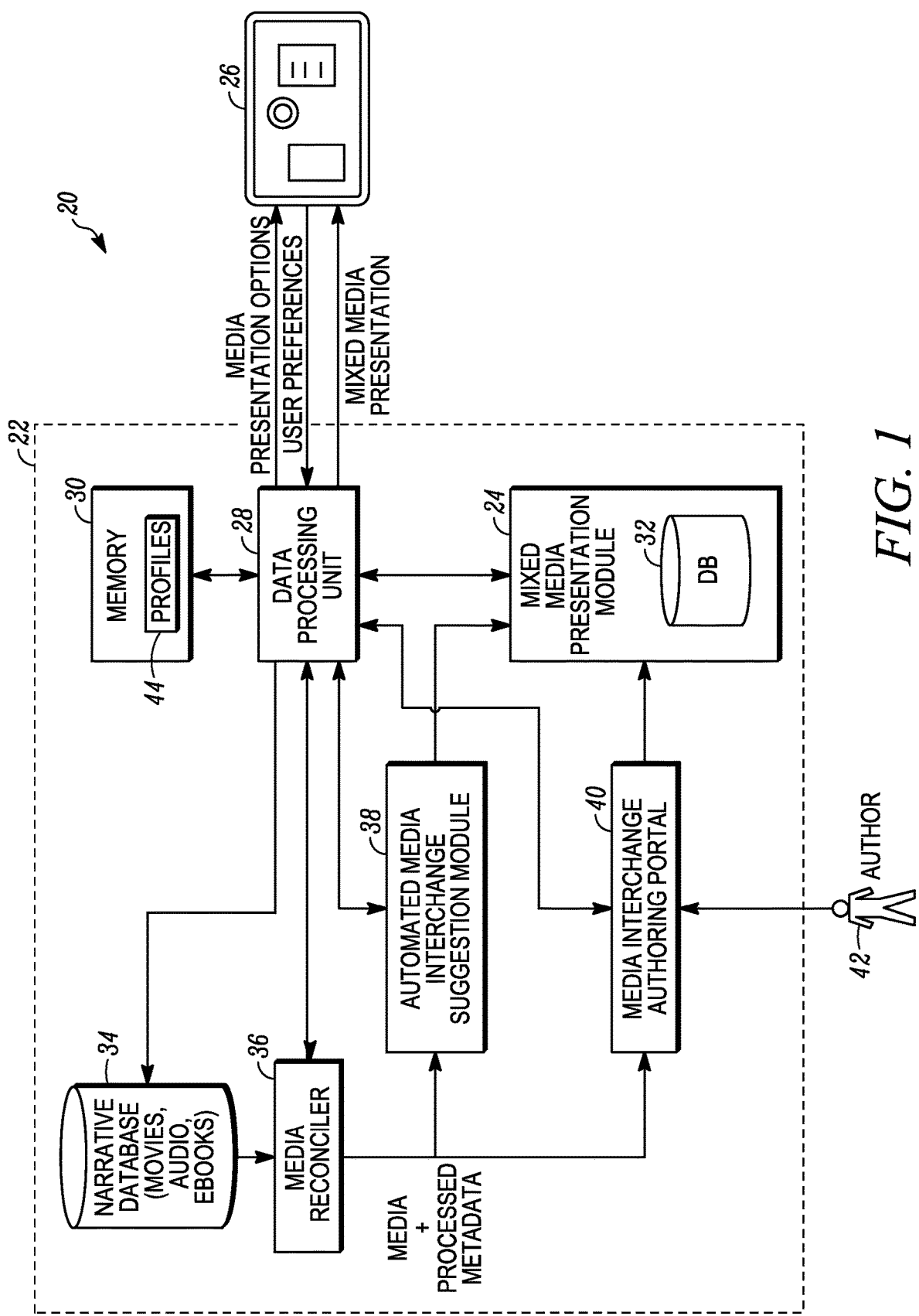
FIG. 1 is a block diagram of a mixed media presentation system, in accordance with an embodiment.

Referring in detail to the drawings where similar parts are identified by like reference numerals, and, more particularly to FIG. 1, a mixed media narrative presentation system 20 comprises, generally, a mixed medium presentation system 22, including a mixed media presentation module 24, communicatively connectable to a user's computing device 26 which may comprise, by way of examples only, a laptop computer, a tablet computer or a cellular telephone. The mixed media presentation system 22 includes a data processing unit 28 arranged to execute programs according to a set of program instructions and data stored in a memory 30. The data processing unit 28 is arranged to communicate with remote computing devices, such as the user's computing device 26 and to communicate with a mixed media presentation memory 32 of the mixed media presentation module 24 in which segments of one or more narratives in one or more mediums of expression are stored.

Figure 2:
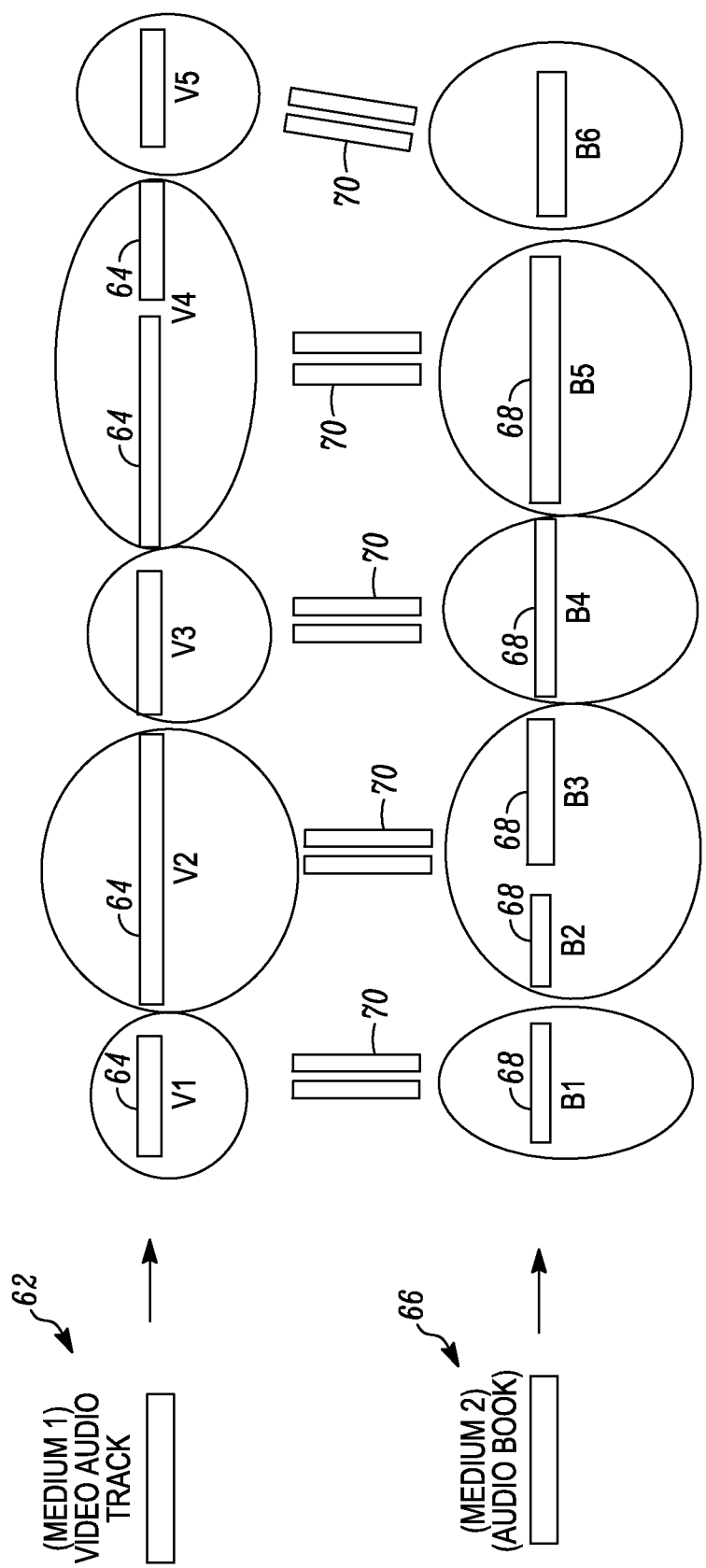
FIG. 2 is a block diagram of a process of segmenting and linking segments of a narrative as expressed in two mediums, in accordance with an embodiment.

A narrative commonly comprises a sequence of narrative segments. For example, a digital video typically comprises a plurality of sequential scenes, each comprising a succession of frames or images and an audio track which may include dialogue, music and sound effects. Books, in either text or audio form, commonly comprise a series of chapters, each, typically, comprising a plurality of paragraphs each of which, in turn, comprises one or more sentences including topic and supporting sentences and dialogue. Referring also to FIG. 2, in the mixed media narrative presentation system 22, an expression of a narrative, for example a video, is stored in a narrative data base 34. The data processing unit 28 directs the recovery of a narrative expression; for example, medium 1, an audio track of video 62; from the narrative data base 34 and transmits the narrative expression to a media reconciler 36. The media reconciler 36 defines a succession of segments 64, for example, video audio track segments 62, making up the narrative expression and associates metadata with each segment identifying and describing the segment. Similarly, the media reconciler might segment the scenes of a video or the scenes of an image portion of a video or the topic and background sentences and dialogue of an audio book or an e-book.

In the mixed media presentation system 22, the segmented narrative expression may be transmitted to either an automated media interchange suggestion module 38 or a media interchange authoring portal 40. In the automated media interchange suggestion module 38 the data processing unit 28 analyzes the segments of plural medium expressions, for examples, segments 64 of the first medium expression 62 of the narrative and the metadata describing the respective segments, and compares the segments of the first medium expression to respective segments 68 and associated metadata of the second medium expression 66, for example an audio book, to determine which segments of the first medium expression are substitutable for the segments of the second medium expression. The automated media interchange suggestion module adds metadata 70 to each segment of the plural expressions of the narrative linking a segment 64 of the first expression 62 to one or more corresponding segments 68 of the narrative in the second medium expression 66 and vice versa. For example, segments of a video audio track containing a character's dialogue may be linked to segments of an audio book or an e-book where the character is quoted enabling substitution of the video actor's dialogue for the narrator's dialogue or the text expressing a character's dialogue. The system provides plural levels of granularity enabling mapping and substitution of segments in differing media and multiple media expressions of the narrative, such as, substitution of a scene from one video expression for a scene of a second video expression or linking of a video scene or image or sound effect to a chapter or a paragraph of an e-book and/or several minutes of an audio book permitting simultaneous presentation of a video scene or image while the narrated audio or a sound effect is output and/or the e-book text is presented on a second or a divided display.

In the media interchange authoring portal 40, an author 42 interested in developing a mixed medium narrative may manually segment a narrative and/or add metadata 70 linking segments of an expression of a narrative to the segments of a second expression of the narrative which has been segmented and stored in the mixed media presentation system's memory.

Figure 7:
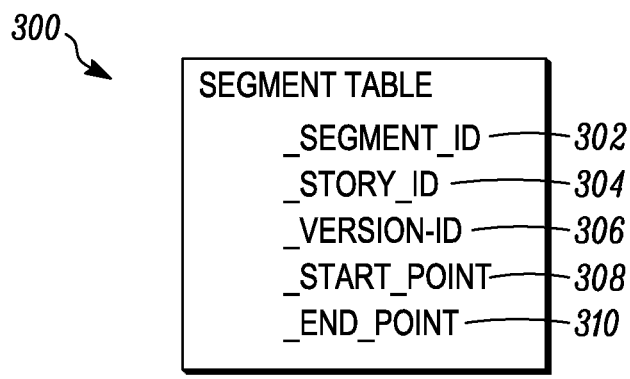
FIG. 7 is an exemplary segment table for identifying a segment of a narrative, in accordance with an embodiment.
Figure 8:
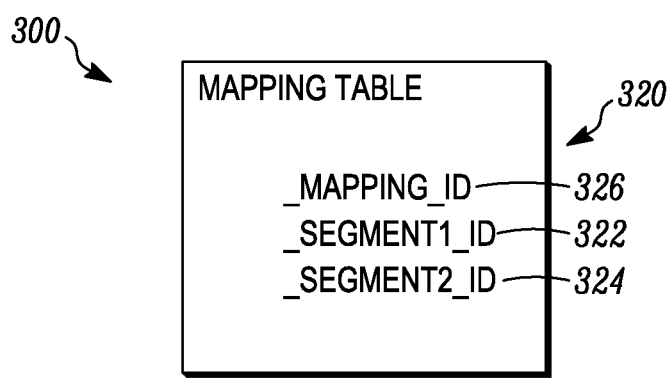
FIG. 8 is an exemplary mapping table for identifying the linkage of narrative segments, in accordance with an embodiment.

When the segments of the plural expressions of a narrative have been linked in either the automated media interchange suggestion module 38 or the media interchange authoring portal 40, the segmented narratives including the segment descriptive metadata linking the segments of the different media expressions are stored in the mixed media presentation module database 32. Referring also to FIG. 7, the segments of each medium expression of a narrative are stored in the mixed media presentation module database 32 as a record in a segment table 300. Each record in the exemplary segment table 300 represents a segment of one medium expression of the designated narrative or story and may include a segment identification 302, a narrative identification 304, a version or medium identification 306, a start point 308 and an end point 310. Referring also to FIG. 8, a mapping table 320 stored in the mixed media presentation module database maps the relationship between any two segments 322, 324 stored in the database with a mapping identification 326.

Figure 3:
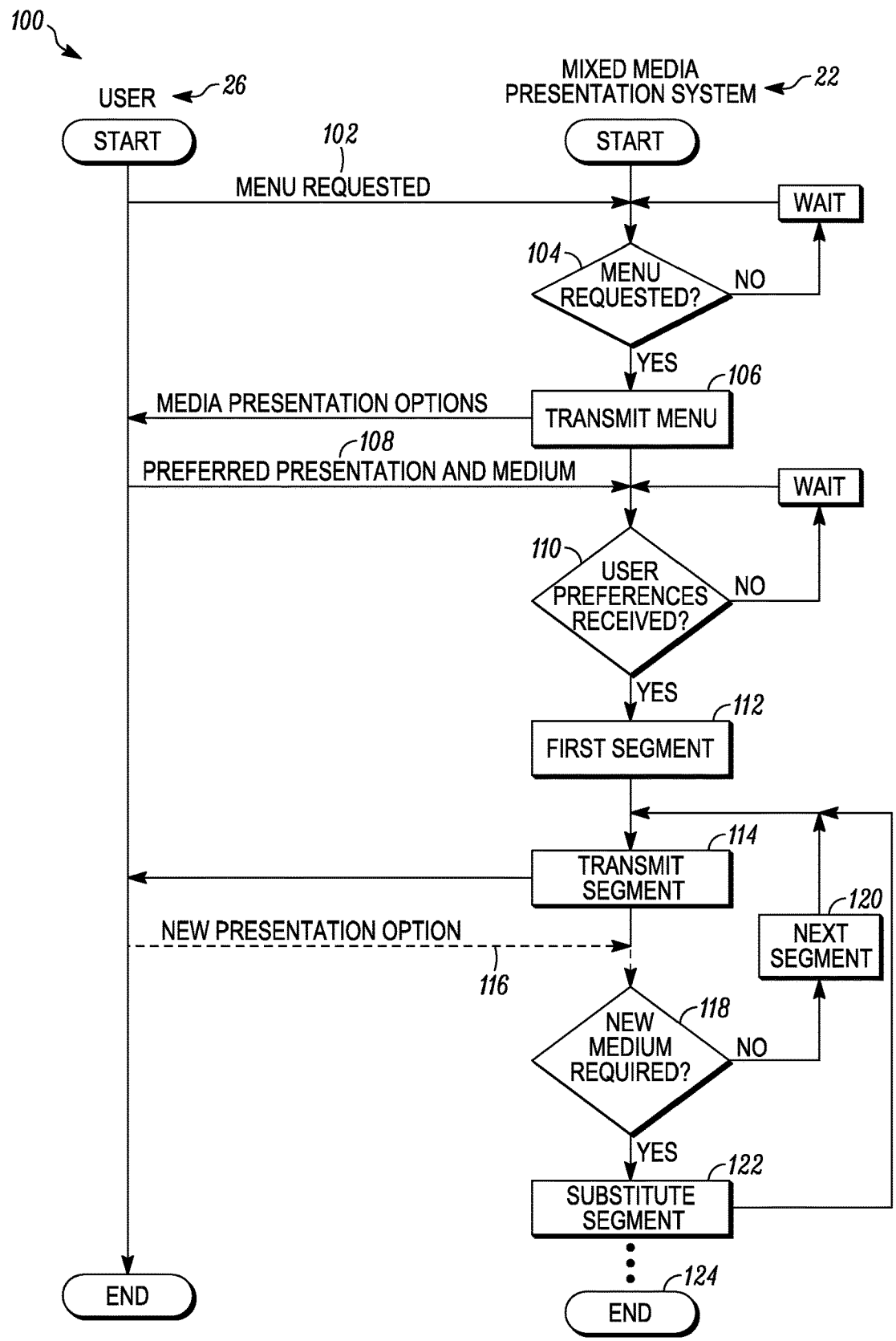
FIG. 3 is a flow diagram of a mixed media narrative presentation process, in accordance with an embodiment.
Figure 4:
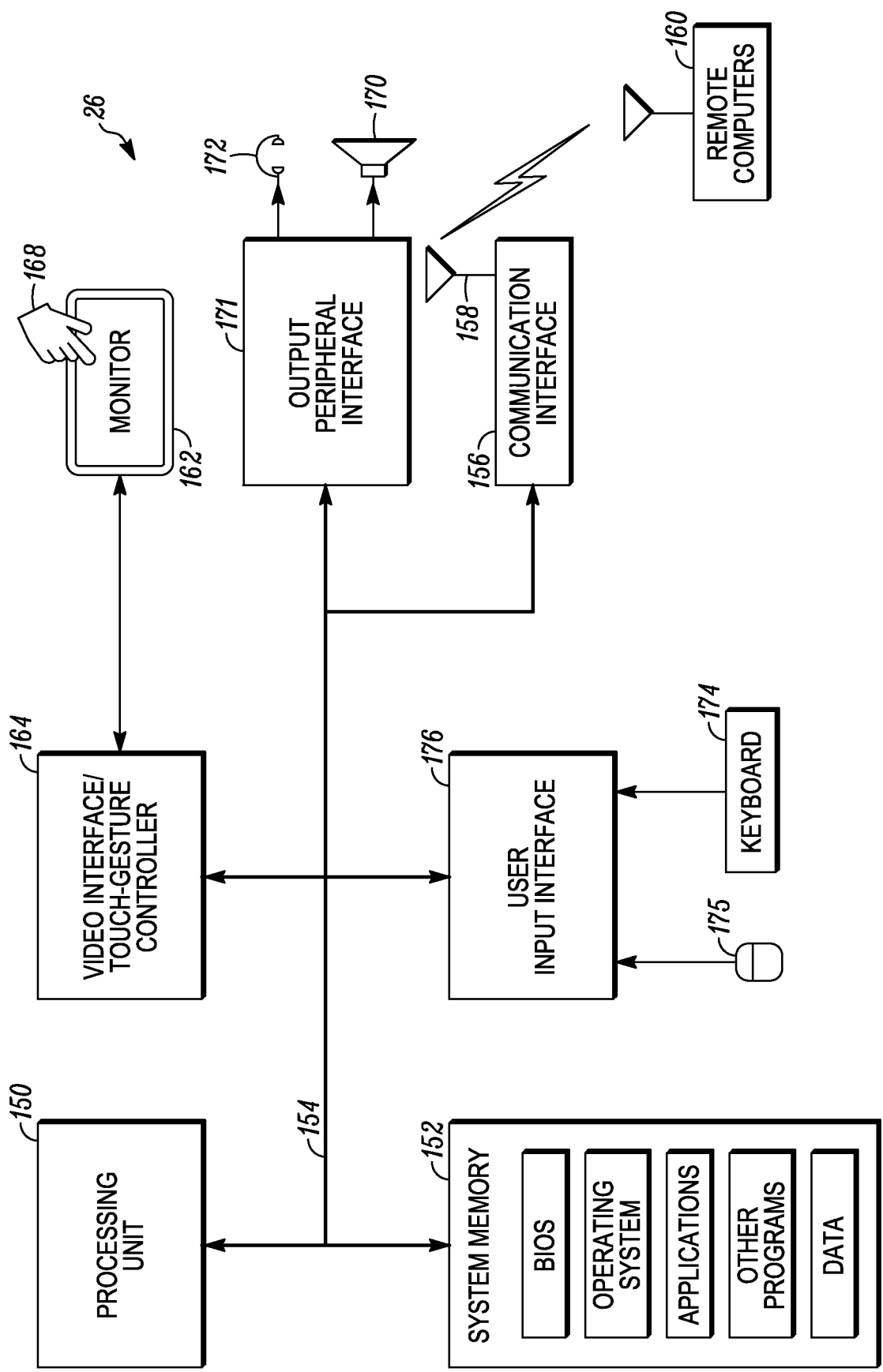
FIG. 4 is a block diagram of an exemplary user's computing device for presenting a mixed media narrative, in accordance with an embodiment.

Referring also to FIG. 3, a mixed media narrative presentation 100 typically begins with a request for a menu of available narratives and media transmitted 102 from a user's computing device 26 to the data processing unit 28 of the mixed media presentation system 22. Referring also to FIG. 4, a user's computing device 26 may be any computing device capable of communicating with the mixed media presentation system 22 and presenting a narrative to the user in one or more mediums of expression selected by the user. By way of examples only, the user's computing device might be a laptop computer, a tablet computer, a mobile phone, television or an e-book reader. The user's computing device 26 comprises, generally, a processing unit 150, a system memory 152 and a system bus 154 that couples the various components of the computing device, including the system memory, to the data processing unit.

The system memory 152 may include nonvolatile and/or volatile computer accessible storage media which may be implemented in any method or technology suitable for storing computer-readable information, such as computer readable instructions, data structures, program modules, narrative data or other data. Computer storage media includes, but is not limited to, random access memory (RAM); read-only memory (ROM); EEPROM; flash memory; optical storage, such as digital versatile disk (DVD), and magnetic storage devices. A basic input/output (BIOS) system containing basic routines that aid in transferring information between elements within the computing device, such as, during start-up, is typically stored in nonvolatile memory. Data and/or program modules, such as an operating system and application programs and data, are also typically stored in non-volatile memory, such as flash memory or magnetic disk storage, but may be copied to volatile memory, such as RAM, for immediate accessibility and/or utilization by the processing unit.

The user's computing device 26 also typically includes a communication interface 156, and can comprise communication media embodying computer-readable instructions, data structures, program modules or other data. Information may be communicated, for example, a modulated data signal having one or more characteristics changeable in a manner to encode information in the signal, such as a carrier wave or other data transport medium. By way of example, but not limitation, communication media includes wired media such as a wired network or a direct-wired connection and wireless media such as acoustic, radio frequency (RF) 158, infrared and other wireless media or any combination of computer readable communication media.

Typically, the user's computing device includes a monitor or other display device 162 for visually presenting data, including video and text data, to the user. The display is commonly connected to the processing unit via a video interface 164. In addition, the user's computing device 26 commonly incorporates an audio output device, such as a speaker 170 and/or headphones 172 interconnected to the system bus by an output peripheral interface 171. A user may enter commands and information into the computing device through one or more input devices such as keyboard 174 or a pointing device 175, such as a mouse, trackball or touch pad, a microphone or a game pad, which is connected to the processing unit by an input device interface 176. The user's computing device may also comprise a virtual input mechanism such as a virtual keyboard or pointing device operated by touch, stylus or gesture interaction 168 with the monitor 162 and in communication with the data processing unit 156 by a touch/gesture controller which may, for example, be part of the video interface 164.

Figure 11:
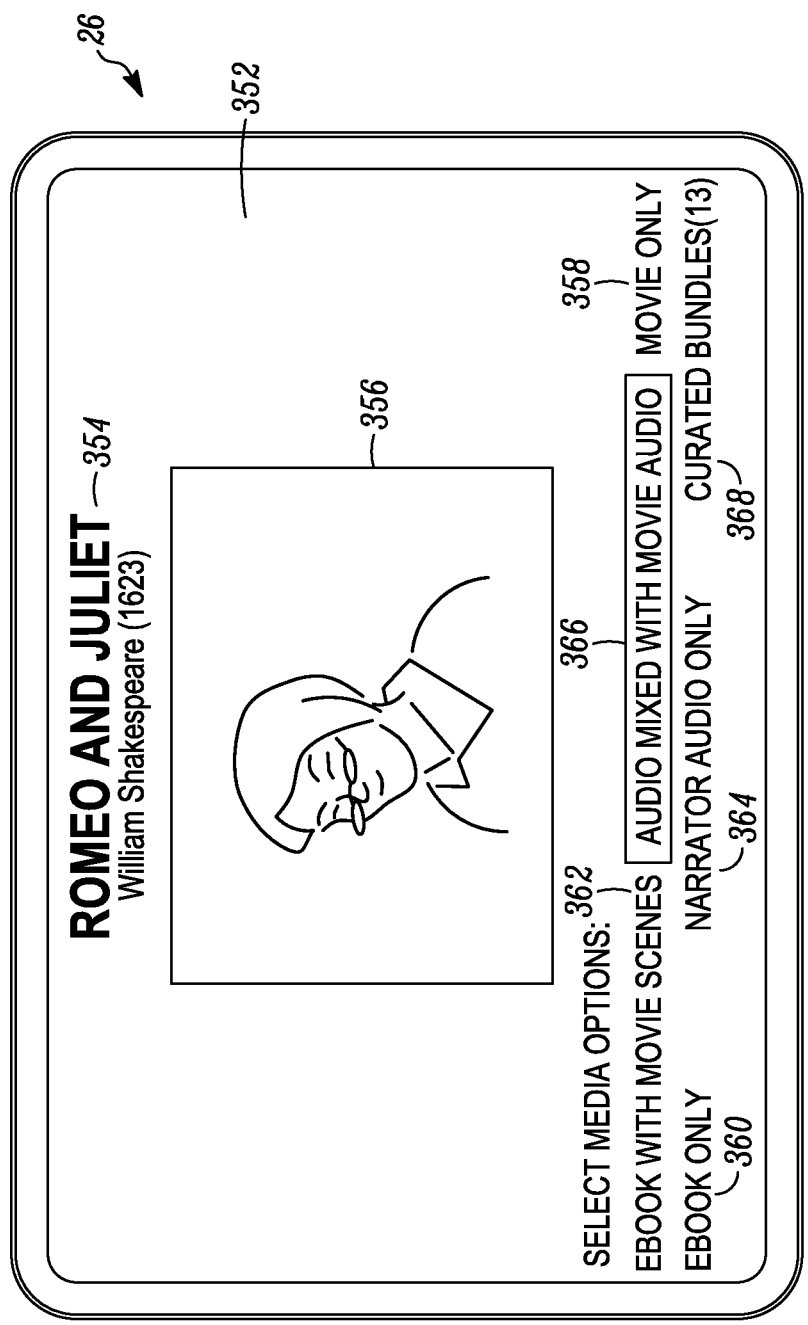
FIG. 11 is an exemplary interface for a computing device enabling selection of differing modes of presentation for a mixed media narrative, in accordance with an embodiment.
Figure 12:
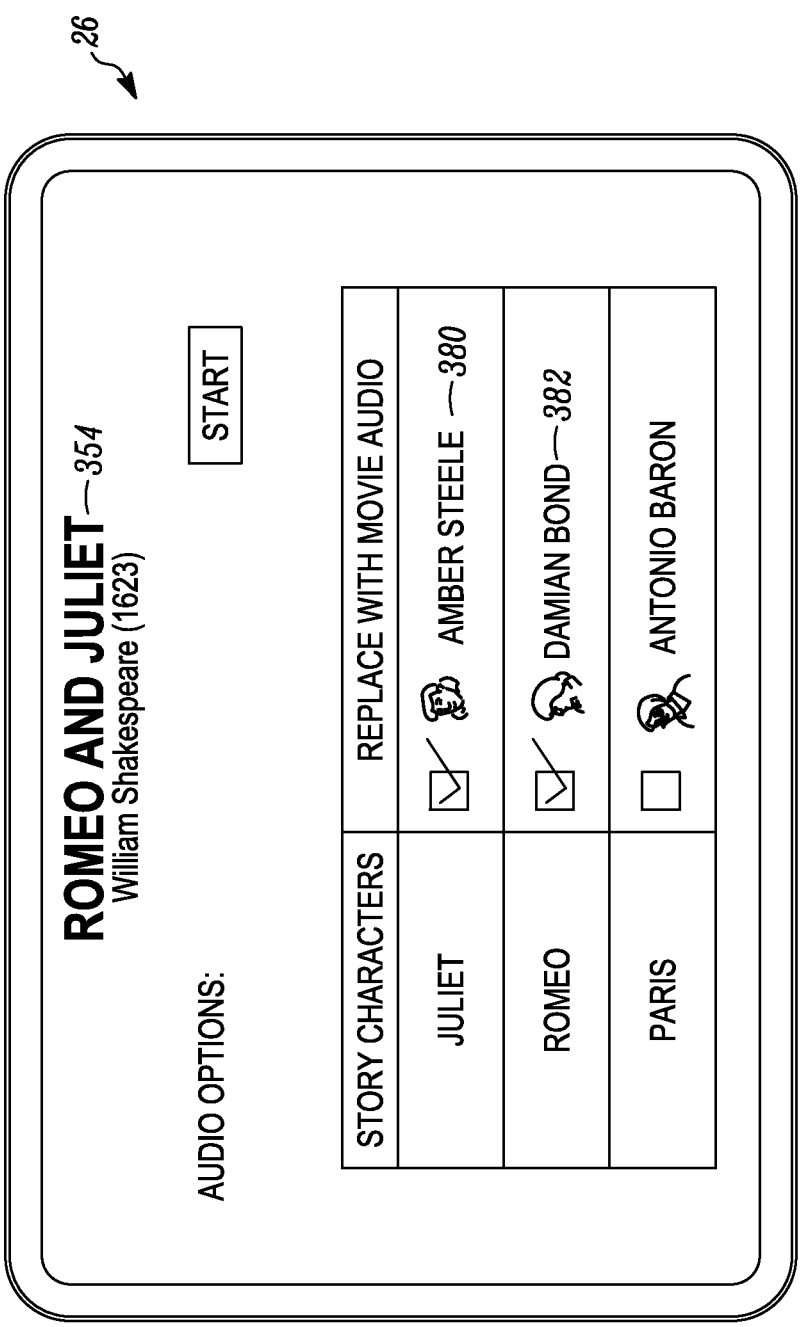
FIG. 12 is an exemplary interface for a computing device enabling selection of specific classes of segments within a medium of expression, in accordance with an embodiment.

When the user inputs a command to the user's computing device 26 requesting a menu of available narratives, the request is transmitted 102 to the data processing unit 28 of the mixed media presentation system 22 by the communication system interconnecting the two devices. Referring also to FIGS. 9, 10 and 11, in response to the request 104, the data processing unit 28 of the mixed media presentation system 22 transmits 106 program data 340, 342 to the user's computing device which is parsed by the user's computing device 26 to create an user interface, for example the user interface 352, presenting the user with a menu of available narratives and options for interchanging segments of one medium expression of a narrative for segments of a second medium expression of the narrative. The user interface may identify a narrative 354 and include a representation from one of the available medium expressions, such as an image 356 from a video, suggesting the content of the narrative. If available for the desired narrative, the user might, by way of examples, elect presentation of a video 358, an e-book 360 or an e-book which includes scenes from the video expression 362 of the narrative; an audio book 364 or an audio book mixed with audio from a video 366 or a package of segments that have been bundled according to the user's profile or a profile of a group of users 368. Further, referring also to FIG. 12, when the user selects a presentation option, the interface may present additional options enabling the user to explore the granularity of the narrative presentation. For example, the user may select certain groups or classes of segments within a medium expression, for example, only the segments representing certain characters or speakers 380, 382 in an audio track as preferred substitutes for the narrator of an audio book.

From the menu of available narratives and narrative expressions presentable on the user's computing device, the user can select a preferred narrative and medium of expression to be presented. The user preference for a narrative and a medium of expression is transmitted 108 from the user's computing device to the data processing unit 28 of the mixed media presentation system 22 and stored in the mixed media presentation system memory 30. Alternatively, a user profile 44 including media preferences previously selected by the user may be stored in the memory 30 of the mixed media presentation system 22 or stored on the user's computing device for transmittal to the mixed presentation system when the user requests a menu of available narrative expressions. In addition, statistical information related to media interchanges requested by past users or groups of users of a narrative, such as social media associates of the user, may be stored in the memory of the mixed media presentation system and presented to a user as a graphic or other representation of the popularity of a particular preference, for example, as a heat map, enabling the user to select more commonly requested segments and media when a narrative is presented.

Referring also to FIG. 10, when the user preferences are received by the mixed media presentation system 110, the data processing unit 28 recovers the requested segment of the narrative in the preferred medium of expression from the memory 32 of the mixed media presentation module 24 and transmits program data 342 enabling presentation of the segments of the narrative in the versions and order selected by the user and the segment, for example, the first segment of the narrative, to the user's computing device 114 for presentation to the user. The data processing unit 28 of the mixed media presentation system determines whether a new presentation option 116 has received from the user's computing device 26 and whether the new presentation option includes a request for a different medium expression of the narrative 118. If the narrative is being presented to the user as an ordered sequence of segments, and a new medium has not been requested 118, the data processing device 28 recovers the next segment in the current medium expression of the narrative 120 and transmits the next segment to the user 114. However, if a new medium has been requested by the user's computing device 118, the data processing unit 26 of the mixed presentation system 22 examines the metadata associated with the next segment of the current medium expression of the narrative and the metadata associated with one or more segments of the new medium expression to find one or more segments of the new medium expression which are substitutable the next segment of current medium expression 122. Alternatively, the data processing unit might determine the identity of and transmit a segment of the new medium expression that is substitutable for the last segment of the current medium expression that was transmitted. As a further alternative, if requested the mixed media presentation system might retransmit a segment of a narrative enabling a replay of a segment of the narrative. The mixed media presentation system continues to transmit segments of the narrative expressed in the medium requested by the user's computing device until the end of the narrative has been reached or the user's request for segments has been satisfied 124.

Figure 5:
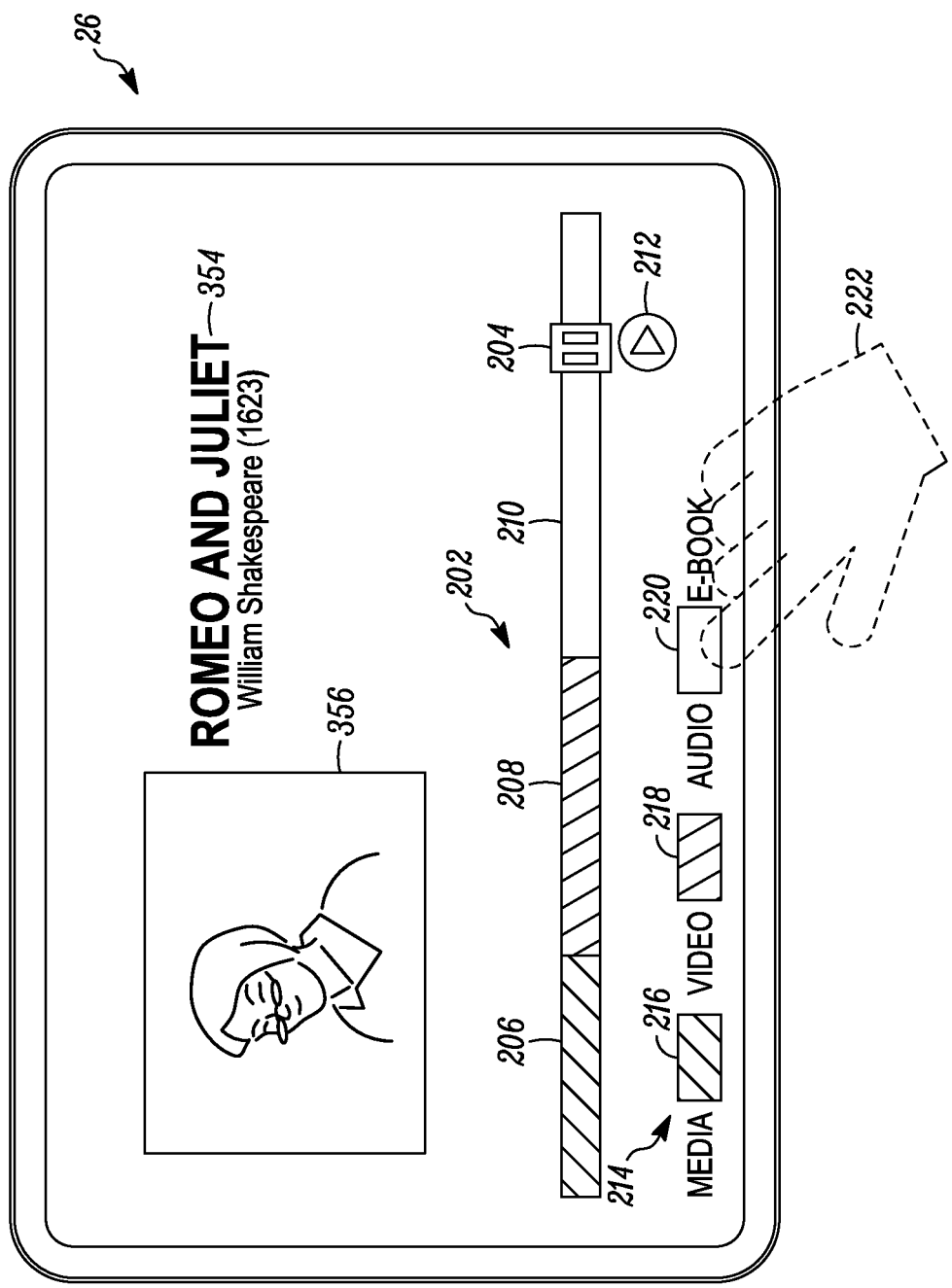
FIG. 5 is a front view of a user's computing device displaying a first embodiment of an interactive user interface for a mixed medium narrative presentation, in accordance with an embodiment.

In an embodiment, a mixed media experience would be improved by a novel interactive user interface for the user's computing device 26 enabling a user to monitor and control the progress of a mixed media narrative presentation and enabling the user to select the media in which portions of the narrative are presented. Referring to FIG. 5, a first embodiment of the mixed media interface 200 includes a progress bar 202 including a progress icon 204 indicating the progress in a narrative's presentation. In addition, the progress bar 202 indicates the medium(s) in which the narrative is and has been presented. For example, the exemplary progress bar 202 indicates that an initial portion 206 of the narrative was presented as a video, followed by a second portion of the narrative 208 presented as an audio book, which was, in turn, followed by a portion 210 which was presented as an e-book. A user selectable presentation icon 212 controls the progress of the presentation and indicates whether the presentation of the narrative is proceeding or, as illustrated, has been halted.

The mixed media user interface 200 also includes a media selector 214. When the user's computing device 26 receives a segment of the narrative from the mixed media presentation system 22, the narrative segment may be accompanied by metadata describing the presentation options, including the available media expressions, for the next segment of the narrative. The media selector 214 displays the medium expression options, for example, video 216, audio 218 and e-book 220 for the next narrative segment. The user may select a new medium expression for the next narrative segment by selecting one of the available medium expression options, for example, by touching 222 a portion of the monitor displaying the desired one of the available media options. Alternatively, the mixed media presentation module may recover a segment of the narrative in the new medium of expression that is substitutable for the segment being presented and transmit that segment to the user's computing device for presentation after completion of the presentation of the current segment or the segments of plural media expressions may be presented simultaneously on differing output devices of the user's computing device, for examples, audio and video may be simultaneously presented with a display and speakers or text and images may be presented simultaneously on two displays or a display divisible into plural windows. In this case, the media selector indicates the media options for the segment that is being currently presented. The mixed media presentation module continues to recover successive segments of the narrative from memory in the user selected medium of expression and transmit those segments to the user's computing device until the user selects another medium of expression or interrupts the presentation by selection of the presentation icon 212 or until the last segment of the narrative has been presented.

Figure 6:
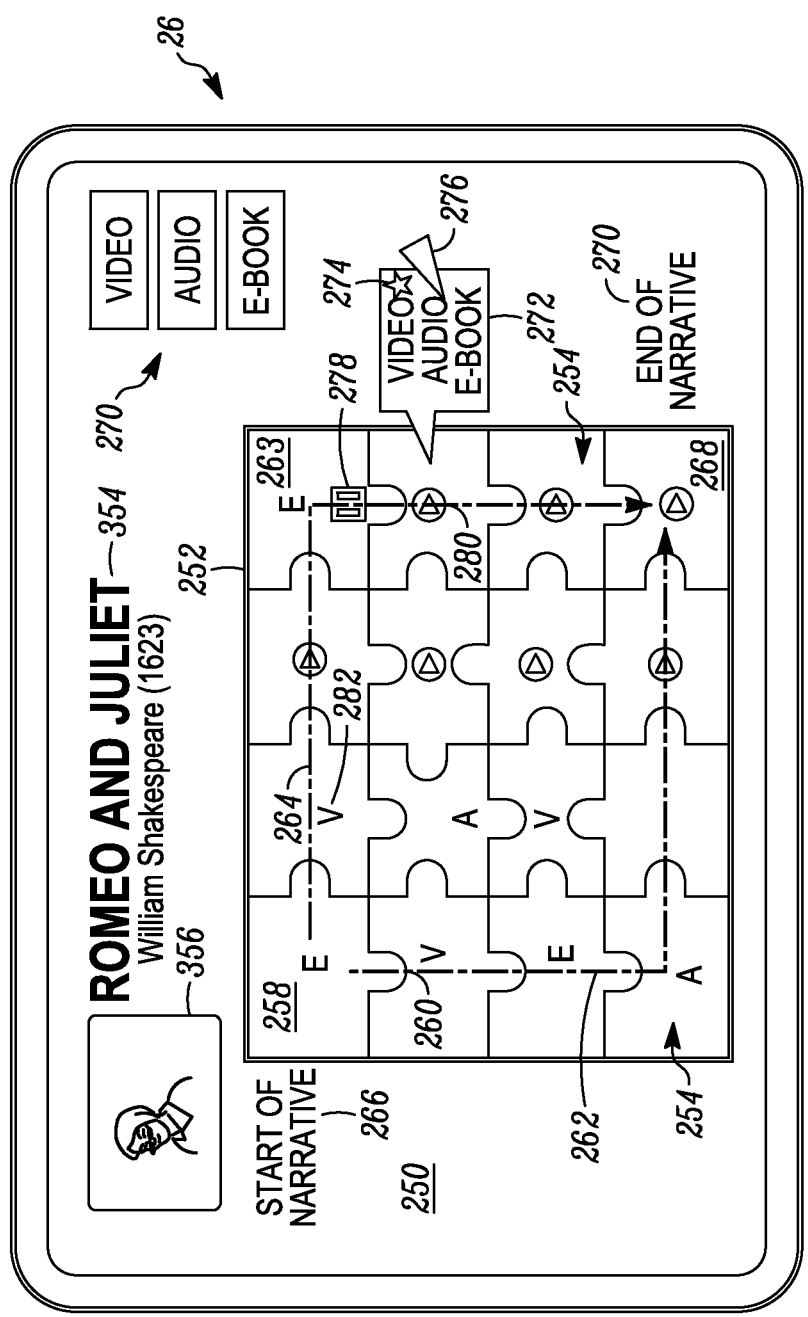
FIG. 6 is a front view of a user's computing device displaying a second embodiment of an interactive user interface for a mixed medium narrative presentation, in accordance with an embodiment.

Referring to FIG. 6, in a second embodiment of a novel user interface 250 for mixed media narrative presentation on a user's computing device 26, the user can choose between an ordered presentation of narrative segments and a random presentation of segments. The user interface 250 enhances the user's experience by representing the narrative presentation as a game where the narrative is represented by an area of the interface 252 and each segment of the narrative is represented by a graphic 254, for example, a graphic puzzle piece. The individual puzzle pieces, for example, puzzle piece 258 are arranged to indicate a relationship of the corresponding segment with the segments represented by neighboring pieces. For example, a protruding lobe 260 on a puzzle piece might indicate a direction in which the segments of a narrative proceed. The user may be able to choose from multiple plotlines 262, 264 for a narrative by selecting a puzzle piece having plural lobes indicating a progression of the narrative to either of plural segments represented by respective adjoining puzzle pieces.

The user may elect to have the narrative presented as an ordered succession of segments by selecting puzzle pieces corresponding to one of the possible plotlines and then selecting the area of the interface denoted by the "Start of Narrative" legend 266 with a pointer or other selection mechanism available on the user's computing device. The computing device will then select an ordered progression of the narrative segments, each represented by an adjacent puzzle piece, ending with the segment 268 adjacent to the "End of Narrative" legend 270 or the last segment selected by the user.

On the other hand, the segments of the requested narrative may be presented in a random manner by selecting an individual puzzle piece 254, for example, the piece 263. Selected segments of the narrative will be obtained from the mixed media presentation memory 32 and transmitted to the user's computing device for presentation.

The available media for presenting the next segment of an ordered presentation of a narrative or a selected segment of a narrative may be indicated to the user by either a media selection area of the interface displaying controls 270 enabling selection of one of the mediums available for presentation of the segment or by pop-up menu 272 which appears when the user engages a respective puzzle piece with a pointing device. The pop-up menu 272 may include an indicator 274 of a preferred medium for the segment based on the medium selected for adjacent segments or a prior selection by the user or selection by a group of users or otherwise. When the interface indicates that plural media are available for presentation of a segment, the user may select a preferred medium by selecting one of the available media 276. The identity of the preferred medium is transmitted to the data processing unit 28 of the mixed media presentation system 22 which recovers the segment in the designated medium from the mixed media presentation memory 32 and transmits the segment to the user's computing device 26 for presentation. A progress icon 278 displayed on the interface indicates which segment is currently being presented and may include an indication 279 of the state of completion of the segment's presentation. A presentation control icon 280 enables selective control of the progression of the narrative presentation and indicates whether the presentation is proceeding or, as illustrated, has been halted by the user. As each segment is presented, a label 282 is superimposed on the corresponding puzzle piece indicating the medium in which that segment of the narrative was presented.

Figure 13:
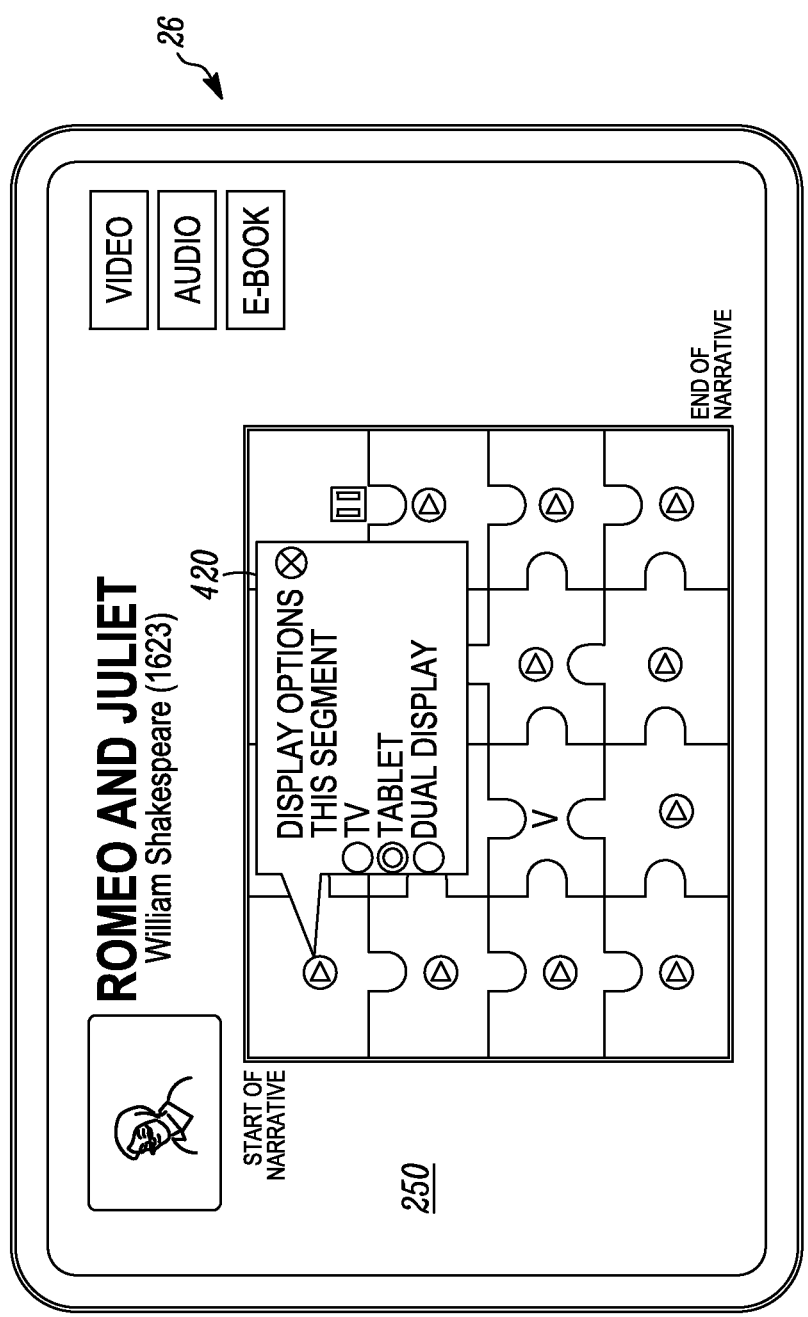
FIG. 13 is an exemplary interface for a computing device enabling selection of devices for presentation of a narrative segment, in accordance with an embodiment.

Referring also to FIG. 13, the interface 250 may include controls 420 enabling the user to select particular computing devices for presentation of a segment or for simultaneous presentation of plural media expressions of a segment on differing devices, such as displaying an image on a tablet computer and a corresponding audio segment on an MP3 player.

Figure 14:
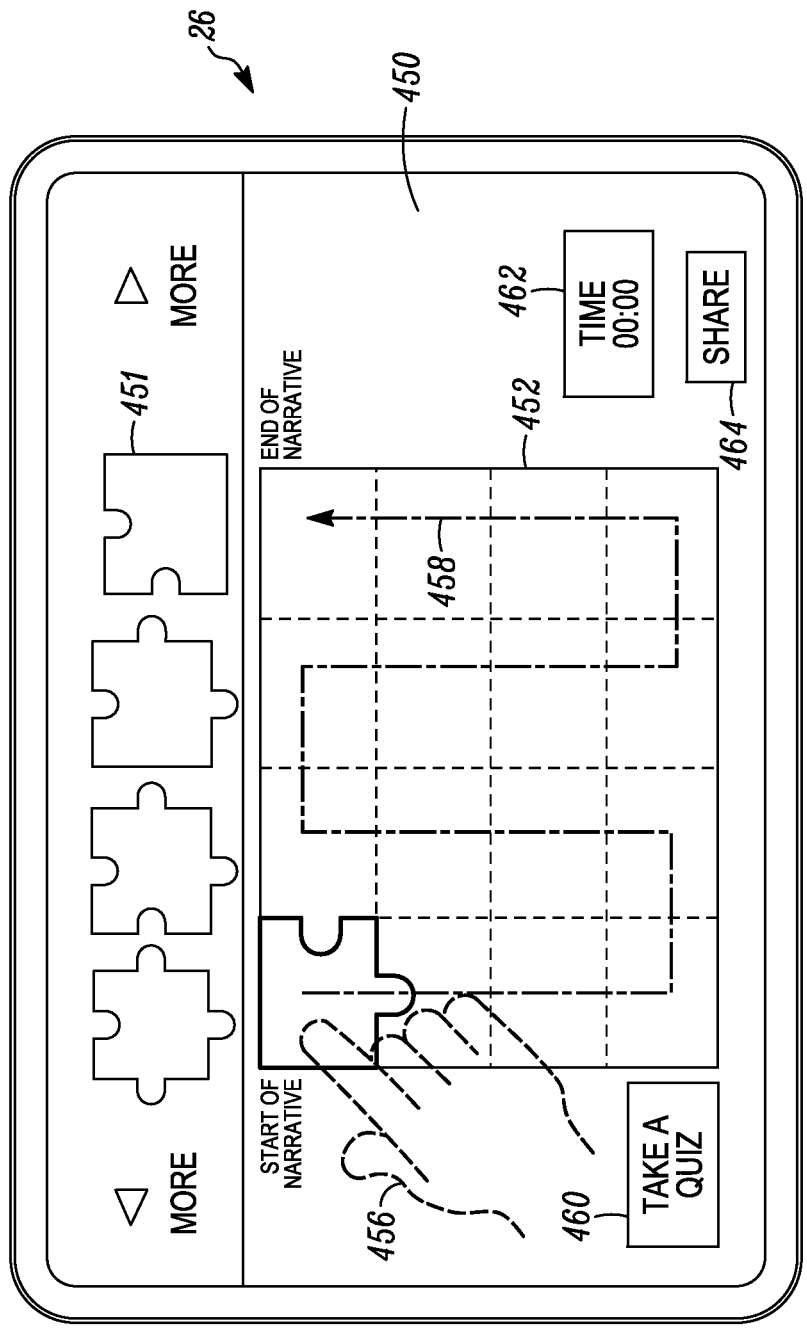
FIG. 14 is an exemplary interface for a computing device for presenting a mixed media narrative as a game, in accordance with an embodiment.

To further enhance the user's experience, a user interface enabling a user to select narrative segments in a game where the user may compete against a clock to fit the segments into a complete narrative may be presented on the user's computing device 26. Referring also to FIG. 14, for example, a user interface 450 may display a skeleton 452 for a puzzle and a number of puzzle pieces 454 each representing a segment of the narrative. The user 456 can select and move a puzzle piece and place the selected piece on the skeleton 452 to complete a narrative piece-by-piece following a plotline representation 458 on the skeleton. On the other hand, the user may be encouraged to guess what comes next in a narrative by selecting puzzle pieces that fit adjoining pieces without any indication of a progression of a plot. When the puzzle is completed the user can activate presentation of the narrative that the user has constructed by selecting the "start of narrative" area of the interface. Alternatively, the segments may be presented in a selected medium as the segments are selected by the user, for example, when the user selects a corresponding puzzle piece. After a segment is presented, the user may select the segment again enabling presentation in the same medium or presentation of linked segments in one or more other mediums selected by the user. The user interface also times 462 the completion of the puzzle to provide a measurement of the user's performance and enables the user to share the experience with others through a social media interface control 464. The user interface 450 also includes a control 460 enabling the user to respond to questions about the narrative and score his/her understanding of the subject and, while the mixed media narrative presentation system may be used for entertainment, it may also be used to enhance a user's experience during other activities, such as education or mixed media news presentations.

The mixed media narrative presentation system enables a user to select and mix the mediums in which segments of a narrative are presented.

The detailed description, above, sets forth numerous specific details to provide a thorough understanding of the present invention. However, those skilled in the art will appreciate that the present invention may be practiced without these specific details. In other instances, well known methods, procedures, components, and circuitry have not been described in detail to avoid obscuring the present invention.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

We claim:

1. A method of presenting a narrative comprising a plurality of successively presentable narrative segments, at least one segment presentable in plural mutually substitutable mediums of expression, the method comprising:
   presenting a user interface for a computing device, said user interface comprising:
   (i) a media availability indicator indicating availability of mutually substitutable mediums of expression for presenting said at least one segment of said narrative, and
   (ii) a medium selector operable by a user of said computing device to select one of said plural mutually substitutable mediums of expression for presenting said at least one segment of said narrative;
   recovering the at least one segment in the user selected medium of expression from a memory of the computing device;
   transmitting program data enabling presentation of segments of the narrative in a version and an order selected by the user; and
   presenting said at least one segment of said narrative in said user selected medium of expression;
   wherein, when the user selects one of said plural mutually substitutable mediums of expression in the medium selector, an interface of the media availability indicator presents granularity options for presentation of the narrative.

2. The method of claim 1, wherein presenting said at least one segment of said narrative in said user selected medium of expression comprises:
   substituting said at least one segment for one of a succession of segments of a second medium expression of said narrative.

3. The method of claim 2,
   wherein the granularity options comprise selection of segments representing one or more characters or speakers in an audio track as preferred substitutes for the narrator of an audio book; and
   wherein substituting said at least one segment for one of a succession of segments of a second medium expression of said narrative comprises:
   substituting said at least one segment for a currently presented segment of said second medium expression of said narrative.

4. The method of claim 2, wherein substituting said at least one segment for one of a succession of segments of a second medium expression of said narrative comprises:
substituting said at least one segment for a segment of said second medium expression of said narrative to be presented following presentation of a segment being currently presented.

5. The method of claim 1, further comprising:
presenting on said interface an identification of a medium with which said at least one segment was presented after presentation of said at least one segment.

6. The method of claim 1, further comprising:
presenting on said interface a progress indicator indicating a relative place of a currently presented segment of said narrative in a plurality of successively presentable segments comprising said narrative.

7. The method of claim 6, further comprising:
presenting on said interface an identification of a medium with which said at least one segment was presented following presentation of said at least one segment.

8. The method of claim 1, further comprising:
   (a) presenting on said interface plural graphics each graphic representing a respective one of said plural segments of said narrative; and
   (b) following presentation of said at least one segment of said narrative, displaying in said graphic representing said at least one segment an indication of the medium in which said at least one segment was presented.

9. The method of claim 8, further comprising:
presenting said media availability indicator indicating available mediums of expression for said at least one segment by selecting said graphic representing said at least one segment.

10. The method of claim 9, further comprising:
presenting said medium selector when said media availability indicator is presented.

11. A method of presenting a narrative comprising a plurality of presentable narrative segments, at least one segment presentable in plural mutually substitutable mediums of expression, the method comprising:
   presenting a user interface for a computing device, said user interface comprising a control enabling a user to select a narrative segment class containing plural segments of a first medium expression;
   recovering at least one segment in the user selected medium of expression from a memory of the computing device;
   transmitting program data enabling presentation of segments of the narrative in a version and an order selected by the user; and
   presenting ones of said plural segments of said narrative segment class in substitution for respective ones of plural segments of another narrative segment class of a second medium expression;
   wherein, when the user selects the narrative segment class in the user interface, the user interface presents granularity options for presentation of the narrative.

12. An apparatus for presenting a narrative comprising a plurality of successively presentable narrative segments, at least one segment presentable in plural mutually substitutable mediums of expression, the apparatus comprising:
   (a) a computer accessible memory for storing a program instruction and a datum;
   (b) a data processing unit operable according to a program instruction stored in said memory to present a user interface enabling said user to construct said narrative by selecting ones of said narrative segments, each expressible in a selected medium of expression from the mutually substitutable mediums of expression, the data processing unit further operable to recover at least one segment in the selected medium of expression from the computer accessible memory, and to transmit program data enabling presentation of segments of the narrative in a version and an order selected by the user, wherein, when the user selects the ones of said narrative segments in the user interface, the user interface presents granularity options for presentation of the narrative; and (c) an output device communicatively connected to said data processing unit to present said selected segments of said narrative to said user, each segment presented in a respective user selected medium of expression from the mutually substitutable mediums of expression.

13. The apparatus of claim 12, wherein said data processing unit substitutes at least one segment of a second medium expression of said narrative for a segment of said first medium expression of said narrative being currently presented with said output device.

14. The apparatus of claim 12, further comprising a second output device communicatively connected to said data processing unit, said data processing unit operable to simultaneously present said at least one segment of said second medium of expression concurrently with said segment of said first medium expression of said narrative.

15. The apparatus of claim 12, wherein said data processing unit substitutes at least one segment of a second medium expression of said narrative for a segment of a first medium of expression to be presented following presentation of a narrative segment being currently presented with said output device.

* * * * *